April 9, 1957 W. S. ALDRICH ET AL 2,787,941

PLATEN TAPE APPLYING METHOD AND APPARATUS

Filed Feb. 18, 1952 4 Sheets-Sheet 1

INVENTORS
WALTER S. ALDRICH
ROBERT H. HANES
BY Carpenter, Abbott, Coulter & Kinney
ATTORNEYS April 9, 1957 W. S. ALDRICH ET AL 2,787,941

PLATEN TAPE APPLYING METHOD AND APPARATUS

Filed Feb. 18, 1952 4 Sheets-Sheet 2

INVENTORS
WALTER S. ALDRICH
ROBERT H. HANES
BY Carpenter, Abbott, Coulter & Kinney
ATTORNEYS

PLATEN TAPE APPLYING METHOD AND APPARATUS

Filed Feb. 18, 1952 4 Sheets-Sheet 3

INVENTORS
WALTER S. ALDRICH
ROBERT H. HANES
BY Carpenter, Abbott, Coulter & Kinney
ATTORNEYS.

PLATEN TAPE APPLYING METHOD AND APPARATUS

Filed Feb. 18, 1952

4 Sheets-Sheet 4

INVENTORS
WALTER S. ALDRICH
ROBERT H. HANES
BY [signature]
ATTORNEYS 2,787,941
Patented Apr. 9, 1957

2,787,941

PLATEN TAPE APPLYING METHOD AND APPARATUS

Walter S. Aldrich, Moundsview Township, Ramsey County, and Robert H. Hanes, Stillwater, Minn., assignors to Minnesota Mining & Manufacturing Company, St. Paul, Minn., a corporation of Delaware Application February 18, 1952, Serial No. 272,086

7 Claims. (Cl. 93—1)

This invention relates to the application of adhesive tape to objects or articles, particularly the application of normally tacky, pressure-sensitive adhesive tape.

A specific objective is to provide for the application of a continuous strip of normally tacky, pressure-sensitive adhesive tape having great tensile strength to a carton blank stamped from a piece of boxboard, the tape to extend along one of the two broad surfaces, around an adjoining end surface and thence along the second broad surface, the tape to serve as a "tear strip" after the blank has been formed into a carton, for opening the carton.

A further objective is to provide a method and apparatus for such an operation that is relatively simple, rapid and inexpensive.

No prior method or apparatus known to us, is capable of attaining these objectives.

The invention is primarily characterized by an initial temporary attachment of a portion of the tape to a platen, from whence it is then transferred to the article; it is accordingly sometimes referred to as the "platen method of tape applying" or "platen tape applying."

A portion of a length of tape is removably attached to the platen with its adhesive side facing the platen. The unattached portion of the tape is then affixed to the article to which the length of tape is to be applied, and the article and the platen are moved in relation to each other in the direction of the attached portion in a manner to peel the said portion from the platen and to turn its adhesive side toward the article progressively. Pressing the article and the platen together affixes the turned portion of the tape to the article.

It will be seen that the above described platen tape applying movement or principle will have utility in numerous operations other than the application of tear strips to carton blanks, and all adaptations of the said principle are contemplated as coming within the scope of the invention herein set forth.

The invention provides, inter alia, a species of the tape applying method and apparatus broadly described and claimed in the copending application of Roy R. Allison which was filed August 2, 1951, as Serial No. 240,009.

The specific method and apparatus described below and shown in the accompanying drawings, are illustrative of the invention.

Figure 9:
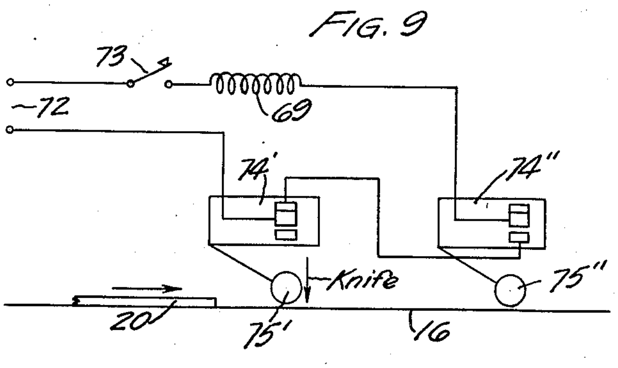
Figure 9 is a wiring diagram for the cutting mechanism.
Figure 10A:
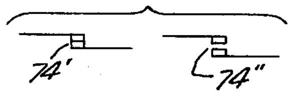
Figure 10B:
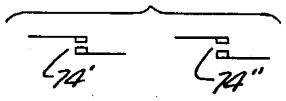
Figure 10C:
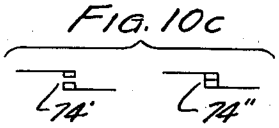
Figure 10D:
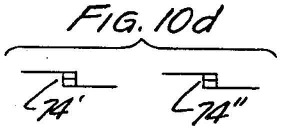
Figure 11:
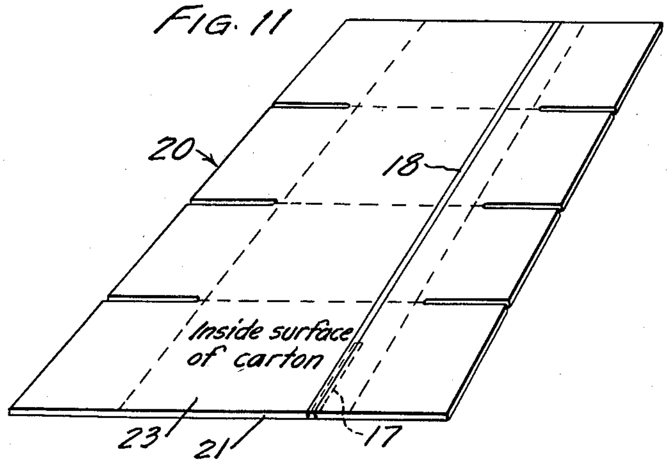
Figure 12:
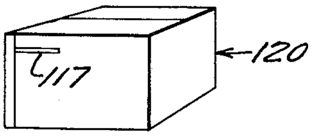

Figures 10*a* to 10*d* show the four successive positions, respectively, of the two switches of Figure 9;

Figure 11 shows a carton blank to which a tear strip has been applied by the machine of Figures 6 to 10*d*; and Figure 12 shows a carton made from the blank of Figure 11.

Figure 1:
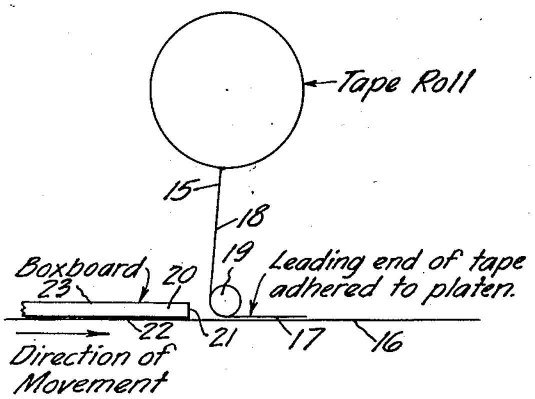
Figures 1 to 5 are diagrams showing the application of a continuous length of tape to three adjoining surfaces of a piece of boxboard.
Figure 2:
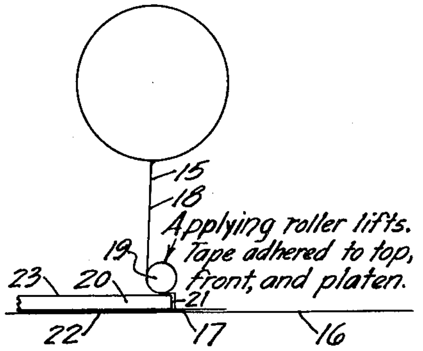
Figure 3:
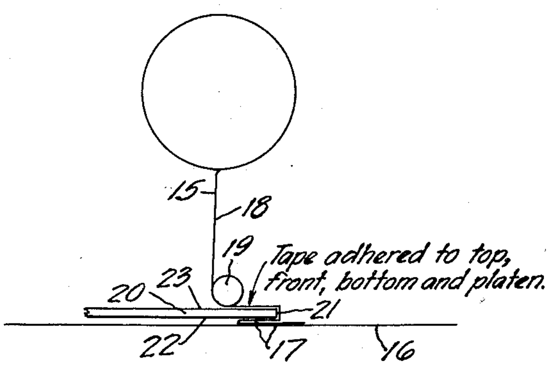
Figure 4:
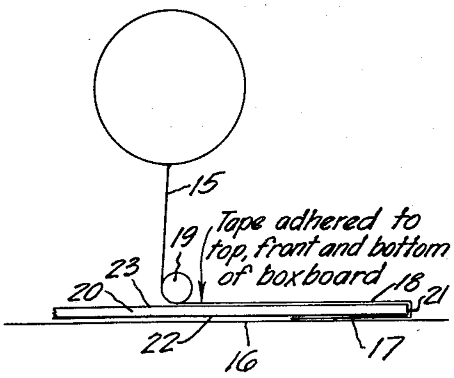
Figure 5:
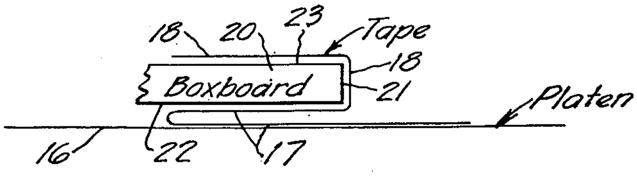

Referring first to Figures 1 to 5, a length of normally tacky, pressure-sensitive adhesive tape 15 is conducted from a source of supply toward a platen 16, and a portion 17 of the said length is temporarily adhered thereto with the succeeding unadhered portion 18 extending outwardly from the platen. A movable buffing or applying roller 19 is in contact with the back of the unadhered portion 18 of the tape (Figure 1). A piece of boxboard 20 that is to be taped on three successive surfaces with a continuous strip, is advanced until its leading end surface 21 bears against the adhesive side of the unadhered portion 18 of the tape. The said motion or advancement of the article is continued, whereupon the roller 19 lifts (Figure 2) and the article thereafter passes between the roller 19 and the platen 16 (Figures 3 and 4). At the same time the roller is caused to bear towards the platen. The force of the moving article peels off the portion 17 of tape that was initially adhered to the platen and turns the tape back on itself (Figure 5). As the adhesive side of the portion 17 is thus progressively turned toward the article (the boxboard), it becomes adhered to the surface 22 thereof. The portion 18 becomes adhered to the opposite surface 23 and to the leading end surface 21.

Figure 5 is an enlarged view of the portion of Figure 3 that shows the advancing end portion of the boxboard. In this figure, as in Figures 1 to 4, it will be understood that the boxboard rests on the platen surface and that the tape is adhered to the boxboard and platen, respectively, notwithstanding the spaced relationship that appears in the diagram; the spacing is an exaggeration to permit a distinct showing of the several separate elements, and is not actual.

Referring now to Figures 6 to 11, a length of tape 15 is conducted from a supply roll 25 around an idler roller 26, a dancing roll 27, a second idler roller 28, and thence down toward a fixed horizontal platen having a smooth, hard, planar top surface 16. The dancing roll 27 is rotatably mounted at the end of a movable arm 29 which is pivotally mounted at 30 on a heavy vertical supporting plate 31.

A roller arm 35 is pivotally mounted at 36 to the supporting plate 31. The left end of the arm 35 is impelled by a spring 37 downwardly against a stop 38.

Near the left end of the arm, a buffing or applying roller 19 is fixed to a horizontal shaft 39 which is journaled in the arm 35 with the roller 19 on the front side of the arm and the shaft 39 extending through to the rear of the arm. A pilot roller 41 is fixed to a horizontal shaft 42 which is journaled in the arm 35 with the roller 41 on the rear side of the arm.

A gear 43 is fixed to the pilot roller shaft 42 between the arm 35 and the roller 41. A similar gear 44 is fixed to the rear end of the applying roller shaft 39 on the rear side of the arm 35 in line with the gear 43. An idler gear 45 connects the two gears 43 and 44. Thus the pilot roller 41 and the applying roller 19 rotate together in the same direction.

The applying roller 19 may be more easily lifted by the force of the advancing article 20 to permit passage of the article between the roller and the platen, if the axis of the roller 19 is above the top of the article when the roller arm 35 bears against the stop 38. The shock is still further diminished and the chances of harm to the leading end of the article 20 lessened, when an advance roller, such as the pilot roller 41, is employed, of such diameter and/or in such position that its lower peripheral extremity is higher than that of the applying roller 19. Thus the lifting of the roller 19 by the force of the advancing article is accomplished gradually in two successive steps. In the present embodiment, the axes of the rollers 41 and 19 are the same distance above the platen but the diameter of 41 is less than that of 19.

The pilot roller 41 serves also to set the applying roller 19 in motion before the latter is struck by the article 20. This lessens the shock of the sudden pull on the tape that normally occurs when the article first strikes a tape that is motionless.

A knurled pinch roller 47 is positioned to the left of the applying roller 19. The two are in peripheral contact, and the tape passes between them as it extends from the supply 25 to the platen 16. The pinch roller 47 is rotatably mounted on the lower end of a short vertical pinch roller arm 48 which is mounted adjacent the front side of the arm 35. The arm 48 is journaled at its approximate mid-point on a horizontal shaft 49 which is fixed in the arm 35. The arm 48 is impelled by a spring 50 to rotate counterclockwise about the shaft 49 so as to press the pinch roller 47 against the applying roller 19.

To facilitate threading the machine with a fresh roll of tape, a large threading cam 51 is rotatably mounted on the vertical supporting plate 31 in a position to bear downwardly against the right end of the applying roller arm 35 when the cam is turned by a hand wheel 52. This raises the left end of the arm 35. When the upper end of the short vertical pinch roller arm 48 bears against a stop 53 that is fixed in the plate 31, the arm 48 is thereby turned clockwise around its shaft 49 against the spring 50 as the cam 51 continues to turn, thereby moving the pinch roller 47 to the left until the tape can be readily threaded or passed downwardly between it and the applying roller 19.

To the right of the buffing roller 19 ("beyond" the said roller, in terms of the travel of the work through the machine), is positioned a long relatively narrow buffing pad 56 which is carried by a buffing pad arm 57. The arm 57 is, in turn, carried by the roller arm 35, being journaled on the fixed shaft 49 in front of the short vertical pinch roller arm 48. The pad arm 57 is provided with a square vertical aperture 58 to permit the tape 15 to pass through from the idler roller 28 to the applying roller 19.

Figure 6:
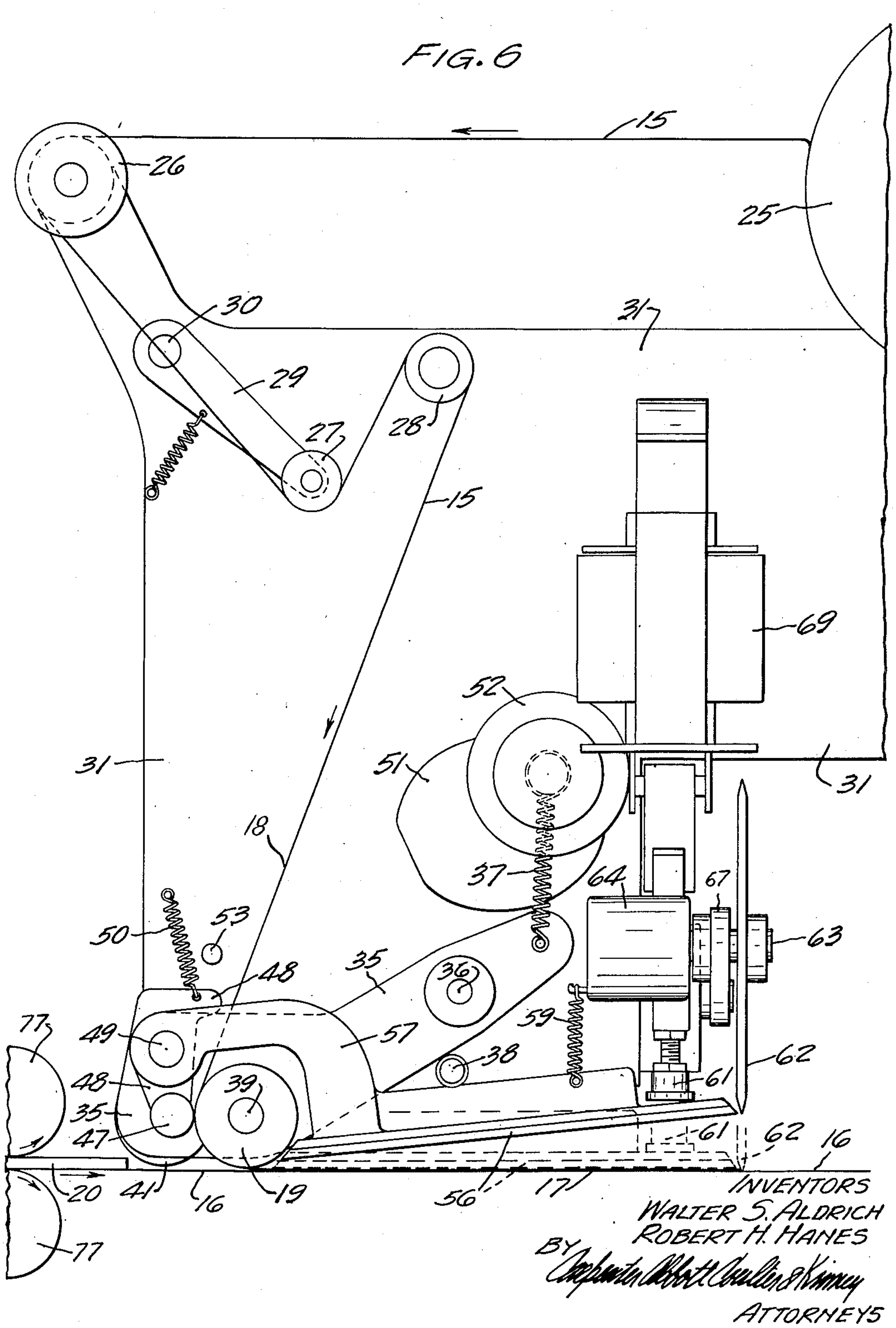
Figure 6 is a diagram of a machine employing a fixed platen for applying tear strips to carton blanks.
Figure 7:
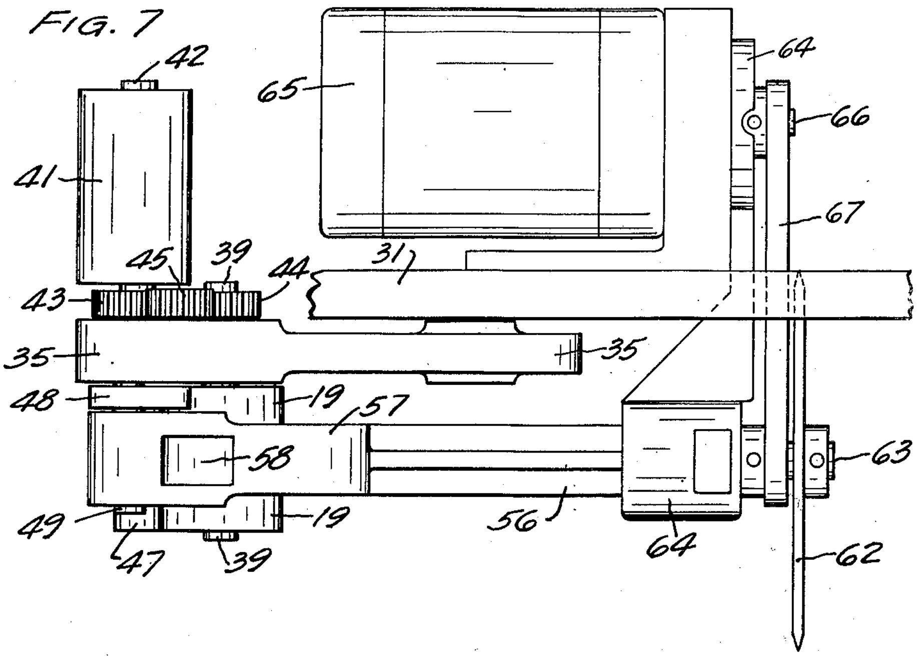
Figure 7 is a plan view of a portion of the applying and the cutting mechanisms of the machine of Figure 6.
Figure 8:
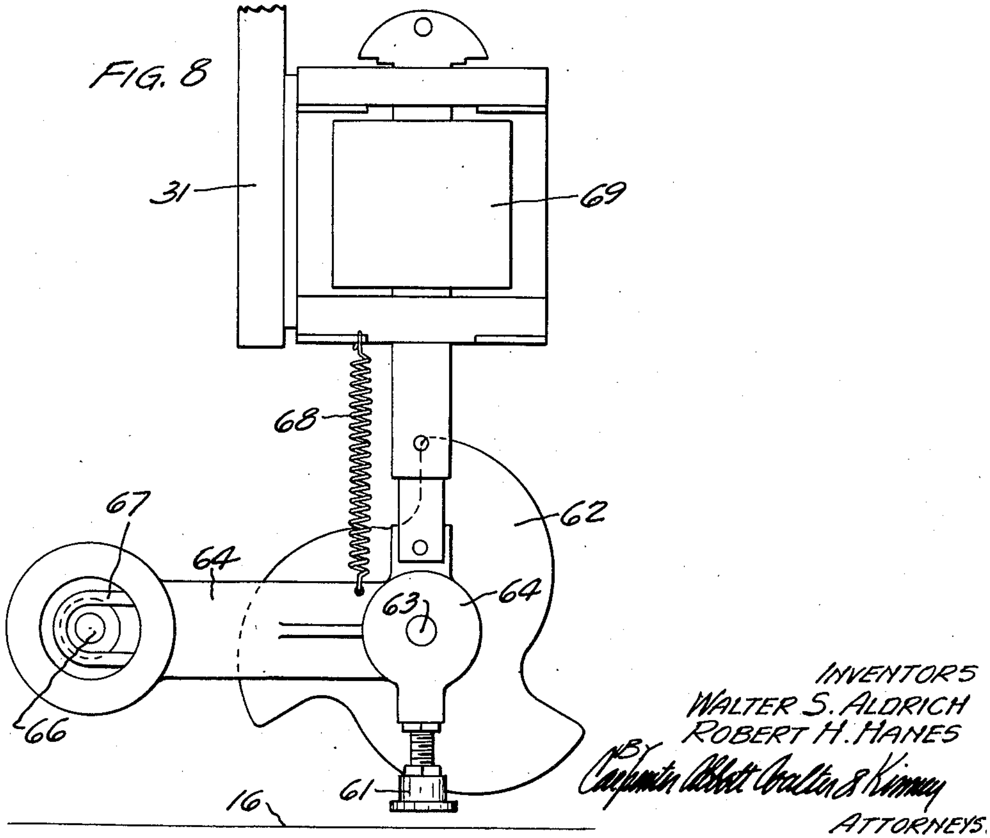
Figure 8 is a left side elevation of the cutting mechanism.

It will be noted from Figure 6 that the point about which the pad arm 57 pivots is above and to the left of the applying roller 19 (above and in "advance" of the said roll, in terms of the travel of the work through the machine).

The pad 56 moves up and down in a large arc about the center of the shaft 49. The pad is drawn upwardly by a spring 59 to the raised position shown in Figure 6, which is the position normally occupied by the pad. The pad is pushed downwardly by a foot 61 into the operative or buffing position against the platen 16 indicated by dotted lines in Figure 6.

The foot 61 is attached to the underside of a movable cutting mechanism or assembly hereinafter described.

A three-bladed rotary knife 62 is fixed to a horizontal shaft 63 which is journaled in the forward portion of a cutting assembly housing 64. A motor 65 at the rear, having a horizontal shaft 66 that extends into the rear portion of the housing parallel with the knife shaft 63, drives the knife shaft through a chain 67. The pad-depressing foot 61 is carried on the under side of the forward portion of the cutting assembly housing 64. The cutting assembly housing 64 is mounted for vertical reciprocation or oscillation about the axis of the motor shaft 66. It is drawn upwardly into its normal position (Figure 6) by a spring 68. It is pushed downwardly into its operative position (Figure 8) by a solenoid 69. The motor 65 is in a fixed position.

The solenoid 69 is actuated from a power source 72 through a solenoid line switch 73, a sensitive snap-action operating switch 74′ and a second such switch 74″, as shown in the wiring diagram of Figure 9. The solenoid operating switches 74′ and 74″ are each equipped with actuating rollers 75′ and 75″, respectively.

The article 20 is propelled or advanced through the machine from left to right in the direction of the arrow by a pair of driven rollers 77 and by a similar pair (not shown) located at the right of the machine (Figure 6).

In operation, a supply roll 25 of normally tacky pressure-sensitive adhesive tape 15 having great tensile strength, is mounted at the top of the machine in such a position that the tape will be adhesive side up when led from the supply to the idler roller 26. From thence it is led around the dancing roll 27, the second idler roller 28 and down toward the platen 16.

The hand wheel 52 is then turned until the pinch roller 47 has been moved away from the applying roller 19 sufficiently to permit the end of the tape to be passed or threaded easily by hand through the aperture 58 in the buffing pad arm 57 and thence between the rollers 47 and 19 with the adhesive side facing the pinch roller 47. As previously explained, this separation of the rollers 47 and 19 is caused by downward pressure of the threading cam 51 against the right end of the roller arm 35, which raises the left end of the arm 35 until the upper end of the pinch roller arm 48 bears against the stop 53. After the tape is thus threaded, the wheel 52 is turned back to its normal original position, permitting the roller arm again to bear against the stop 38 and the pinch roller 47 against the applying roller 19.

The tape is then led to the right from the applying roller 19 along the platen 16 beneath the raised buffing pad 56 until the leading end is directly beneath the knife 62. This leading portion 17 of the tape that extends from the applying roller 19 to the knife 62, is then pressed down upon the platen 16 by hand to adhere it thereto. The unadhered portion 18 of the tape extends upwardly from the platen around the applying roller 19, and thence toward the supply.

The knife motor 65 is then started and is kept running continuously. The solenoid line switch 73 is closed. The propelling rollers 77 (driven by power means not shown) are started and are kept running continuously.

A carton blank 20 is then fed from the left to the propelling rollers 77 whereupon they advance it along the platen 16 in the direction of the arrow until the leading end of the blank strikes the pilot roller 41. Continued advancement of the blank raises the pilot roller and with it the roller arm 35 sufficiently to permit passage of the blank beneath the pilot roller. The leading end of the blank then strikes the applying roller 19 with the unadhered portion 18 of the tape between the roller and the blank, the adhesive side facing the blank. Continued advancement of the blank then raises the applying roller 19 and with it the roller arm 35 until the roller 19 rests on the top surface of the blank.

At this point the tape is adhered to the platen, to the leading end surface of the blank and to the top surface of the blank (Figure 2).

Continued advancement of the blank 20 peels off the portion 17 of tape that was initially adhered to the platen 16 and turns the tape back on itself so that it becomes adhered to the bottom of the blank, and at the same time the portion 18 becomes adhered to the top of the blank (Figures 3 and 5) until all of the portion 17 has been transferred from the platen to the bottom of the blank (Figure 4).

The portion 17 of the normally tacky pressure-sensitive adhesive tape 15 may be thus peeled off after having been first temporarily adhered to the platen, without soiling the platen or harming the tape. The capacity of such tape for such performance is well known. It is due largely to the eucohesive quality of the adhesive employed, i. e., the adhesive is more cohesive than adhesive, but still tacky; also the adhesive has greater adherence to the tape backing than to a surface to which the tape is adhered.

After the trailing end of the blank 20 has passed through the propelling rollers 77, the further propulsion of the blank through the machine along the platen 16 is by similar propelling rollers (not shown) that are located to the right of the knife.

The first solenoid switch 74′ is normally closed and the second solenoid switch 74″ is normally open (Figure 10*a*).

When the advancing carton blank 20 contacts the switch actuating roller 75′, switch 74′ opens and remains open as long as the blank is in contact with the roller 75′ (Figure 10*b*).

The two rollers 75′ and 75″ are spaced apart a distance less than the length of the carton blank 20. Thus when the blank first reaches the second roller 75″, it is in contact with both rollers. Switch 74′ is therefore still open but switch 74″ is then closed (Figure 10*c*).

When the trailing end of the blank passes beyond the roller 75′, switch 74′ closes (Figure 10*d*) thus completing the circuit, whereupon the solenoid 69 is energized and drives the cutting assembly 64 downwardly through its cutting stroke to sever the tape at the trailing end of the blank.

The presser foot 61 is attached to the underside of the assembly housing 64 and consequently presses the pad 56 downwardly at the same time. The tape that was drawn out along the platen to the right of the applying roller 19 by the movement of the carton blank 20 prior to the above described severance, is thus pressed by the downwardly moving pad to become the leading portion 17 of the next succeeding length temporarily adhered to the platen.

When the trailing end of the article 20 passes beyond the roller 75″, switch 74″ opens (Figure 10*a*) and the springs 68 and 59 raise the cutting assembly 64 and the pad 56 back up to their normal positions, respectively.

The carton blank 20 that has been taped with a tear strip in the above described operation, is shown in Figure 11. Figure 12 shows a carton 120 made from the blank, the portion 17 of the tape being there shown as the end 117 on the outside of the carton which is grasped and pulled when the carton is to be opened. The portion 18 extends around the inside surface of the carton. Pulling on the end 117 of the high tensile strength tape will operate, in a manner well known, to tear open the carton.

In the application of such strips to carton blanks, a perfect fitting of the tape around the leading end portion of the blank, as is shown in Figure 5, is not critical. A slight bunching of the tape in that area is not harmful. It is sufficient for tear strip purposes for the tape "to extend along one of the two broad surfaces, around an adjoining end surface and thence along the second broad surface."

The pinch roller 47 and the applying roller 19 are described as being normally in "peripheral contact," and they are so regarded even though the tape is between them.

The illustrated machine is described as being positioned with the platen 16 horizontal. Obviously it may be in any position convenient to its use, and the terms "top," "bottom," "left," "right," etc., are accordingly relative and not limiting.

A buffing roller assembly useful in certain types of machines made according to the present invention, such as the machine described and illustrated herein, is described and claimed in Patent No. 2,715,861 which issued August 23, 1955 on the copending application of Paul W. Jacobsen which was filed November 27, 1953 as Serial No. 394,767.

We claim:

1. A method of adhering a length of normally tacky, pressure-sensitive adhesive tape to an article comprising temporarily adhering a portion of the length of tape to the working surface of a platen, bringing the article and the said platen surface into contiguous relationship, affixing the unadhered portion of the tape to the article, and moving the article and the platen in relation to each other to effect advancement of the article along the platen surface in the direction of the extent of the adhered portion while maintaining the said contiguous relationship, to peel the said adhered portion from the platen surface and progessively to turn its adhesive side toward the article to adhere it thereto.

2. A method of adhering a length of normally tacky, pressure-sensitive adhesive tape to three successive surfaces of an article comprising conducting a length of tape from a source toward the working surface of a platen, temporarily adhering a leading portion of the said length to the said platen surface with the succeeding unadhered portion extending outwardly from the platen surface, advancing the article along the platen surface in a direction to bring the leading end of the article against the adhesive side of the said succeeding portion of tape, continuing the said advancement and simultaneously pressing against the back of the said succeeding portion of tape towards the platen surface with the article between the said succeeding portion and the platen surface to adhere tape to the leading end surface of the article, to the surface of the article facing the platen surface and to the surface opposite thereto, the tape that is applied to the surface of the article facing the platen surface being the said leading portion that was temporarily adhered to the platen surface.

3. An apparatus for adhering a length of normally tacky, pressure-sensitive adhesive tape to three successive surfaces of an article comprising a platen, means for removably applying to the platen a leading portion of a length of tape with the succeeding unapplied portion extending outwardly from the platen toward a source, a movable applying roller in contact with the back of the said succeeding portion of tape, means for causing the roller to bear toward the platen, and means for advancing the article along the platen in a direction to bring the leading end surface of the article against the adhesive side of the said succeeding portion of tape and for continuing to advance the article thereafter between the roller and the platen to apply tape to the said end surface, to the surface facing the platen and to the surface opposite thereto, the tape that is applied to the surface facing the platen being the said leading portion that was removably applied to the platen.

4. A machine for adhering a length of normally tacky, pressure-sensitive adhesive tape to three successive surfaces of an article comprising means for holding a supply of tape, a platen, a movable buffing pad for removably applying to the platen a leading portion of a length of tape from the supply with the succeeding unapplied portion extending outwardly from the platen toward the supply, a movable applying roller in contact with the back of the said succeeding portion of tape, means for causing the roller to bear toward the platen, means for advancing the article along the platen in a direction to bring the leading end surface of the article against the adhesive side of the said succeeding portion of tape and for continuing to advance the article thereafter between the roller and the platen to apply tape to the said end surface, to the surface facing the platen and to the surface opposite thereto, the tape that is applied to the surface facing the platen being the said leading portion that was removably applied to the platen, means for cutting the tape at the trailing end of the article after the said trailing end has traveled beyond the applying roller a distance sufficient to draw out the leading portion of the next succeeding length of tape along the platen in readiness for removable application thereto, and means for causing the buffing pad to press the said leading portion against the platen.

5. A machine for adhering a length of normally tacky, pressure-sensitive adhesive tape to three successive surfaces of an article comprising means for holding a supply of tape, a platen, a pivoted pad arm, a buffing pad on the pad arm for removably applying to the platen a leading portion of a length of tape from the supply with the succeeding unapplied portion extending outwardly from the platen toward the supply, spring means for impelling the pad away from the platen, a pivoted roller arm, a rotatable applying roller on the roller arm in contact with the back of the said succeeding portion of tape, a rotatable pinch roller positioned on the roller arm in advance of the applying roller and normally in peripheral contact with the applying roller with the said succeeding portion of tape passing between them, a rotatable pilot roller positioned on the roller arm in advance of the applying roller, spring means for causing the roller arm to bear toward the platen, a movable knife positioned at the end of the said leading portion of tape that is removably applied to the platen, means for advancing the article along the platen in a direction to bring the leading end surface of the article against the adhesive side of the said succeeding portion of tape and for continuing to advance the article thereafter between the applying roller and the platen to apply tape to the said end surface, to the surface facing the platen and to the surface opposite thereto, the tape that is applied to the surface facing the platen being the said leading portion that was removably applied to the platen, and means for moving the knife and the pad into contact with the tape after the trailing end of the article has traveled beyond the applying roller a distance sufficient to draw out the leading portion of the next succeeding length of tape along the platen in readiness for removable application thereto, to sever the tape and to press the said next succeeding leading portion against the platen.

6. A machine according to claim 4 having a movable cutting assembly comprising a power-driven rotatable knife, solenoid means for moving the knife and the pad into contact with the tape, and automatic means responsive to movement of the article through the machine for actuating the solenoid.

7. An automatic machine for the application of a length of normally tacky, pressure-sensitive adhesive tape having great tensile strength to a carton blank stamped from a piece of boxboard, the tape to extend along one of the two broad surfaces, around an adjoining end surface and thence along the second broad surface, the tape to serve as a "tear strip" after the blank has been formed into a carton, for opening the carton; comprising means for holding a supply roll of tape, a fixed horizontal platen having a smooth hard top surface, a pivoted pad arm, a buffing pad on the pad arm for temporarily adhering to the top surface of the platen a leading portion of a length of tape from the supply with the succeeding unadhered portion extending upwardly from the platen toward the supply, spring means for impelling the pad upwardly away from the platen, a pivoted roller arm, a rotatable applying roller on the roller arm in contact with the back of the said succeeding portion of tape, the pad arm being pivoted to the roller arm at a point above and in advance of the applying roller, a pinch roller arm pivoted to the roller arm at a point above and in advance of the applying roller, a rotatable pinch roller on the pinch roller arm, spring means for impelling the pinch roller into peripheral contact with the applying roller with the said succeeding portion of tape passing between them, a pinch roller arm stop, a hand operated cam for moving the roller arm until the pinch roller arm bears against the stop to hold the pinch roller away from the applying roller during threading of the machine, a rotatable pilot roller positioned on the roller arm in advance of the applying roller, spring means for impelling the roller arm downwardly towards the platen, a movable cutting assembly above the platen having a rotatable knife positioned to intersect the path of the tape during a downward cutting stroke at the end of the said leading portion of tape that is temporarily adhered to the platen, means for rotating the knife, spring means for impelling the cutting assembly upwardly away from the platen, means for advancing the carton blank in a direction to bring the leading end surface of the blank against the pilot roller and thereafter against the applying roller with the said succeeding portion of tape between the blank and the applying roller and for continuing to advance the blank thereafter between the applying roller and the platen to apply the tape to the bottom surface of the blank, around the leading end and thence along the top surface, the tape that is applied to the bottom surface being the said leading portion that was temporarily adhered to the platen, and solenoid means for moving the cutting assembly and the buffing pad downwardly against the tape after the trailing end of the blank has traveled beyond the applying roller a distance sufficient to draw out the leading portion of the next succeeding length of tape along the platen in readiness for temporary adherence thereto, to cut the tape at the trailing end of the blank and to press the said next succeeding leading portion against the platen.

References Cited in the file of this patent

UNITED STATES PATENTS

| | | |
|---|---|---|
| 1,861,144 | Schmiedel | May 31, 1932 |
| 2,109,527 | Fenton | Mar. 1, 1938 |
| 2,324,745 | Weber | July 20, 1943 |
| 2,350,244 | Malhoit | May 30, 1944 |
| 2,401,298 | Fritzinger | June 4, 1946 |
| 2,564,901 | Hess | Aug. 21, 1951 |
| 2,591,559 | Krueger | Apr. 1, 1952 |